Patented Sept. 16, 1947

2,427,624

UNITED STATES PATENT OFFICE 2,427,624

MANUFACTURE OF OXIDATION PRODUCTS OF PERCHLORETHYLENE

Arnold Rushmer, Widnes, and William Watson Smith, Liverpool, England, assignors to Imperial Chemical Industries Limited, a corporation of Great Britain No Drawing. Application May 19, 1943, Serial No. 487,642. In Great Britain July 10, 1942

3 Claims. (Cl. 204—158)

Improvements in the manufacture of oxidation products of perchlorethylene.

It has already been proposed to carry out the thermal oxidation of a chloroethylene by passing oxygen-containing gases through the heated substance in the presence of metalloids or compounds thereof, for example, sulphuric acid. In British specification 534,732 a process for obtaining oxidation products of perchlorethylene is described in which the perchlorethylene is treated with gaseous oxygen in the presence of actinic radiation at elevated temperatures, preferably between 50° C. and 110° C. A photochemical oxidation is thus carried out which is quite distinct from the thermal oxidation, since if the source of light is extinguished very substantial diminution in the rate of reaction ensues, even though the elevated temperature is maintained. It is stated in the specification that under certain circumstances, for example at temperatures near 50° C. the product contains both trichloracetyl chloride and a second substance, probably the isomeric oxide

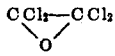

which can subsequently be converted to the chloride by continued heating or by a catalyst. When the reaction is carried out at temperatures near 100° C., substantially none of the isomer is found in the product.

According to the present invention the photochemical oxidation of liquid perchlorethylene with gaseous oxygen is carried out in the presence of a small amount of a strong mineral acid which is substantially non-volatile under the conditions of oxidation.

We find that by having present during the oxidation a small amount of such an acid the rate of reaction is substantially increased; not only, therefore, is the process as a whole speeded up, but it is possible to oxidise an increased proportion of the perchlorethylene before the reaction slows down too much for further oxidation to be economical.

We have further found that instead of using heat-resistant glass or other glass vessels for carrying out the process, the reaction can be carried out satisfactorily in a lead vessel or in a mild steel vessel, the illumination being supplied in such cases by an arc lamp or other similar source of light, e. g., light which is photochemically equivalent to a mercury arc lamp, disposed within a glass or quartz pocket projecting into the reactor.

In one form of our invention the reaction is carried out in a lead-lined reaction vessel having a jacket to which steam or cold water may be supplied as desired, and inlet pipes for air or oxygen and for perchlorethylene. Projecting inwards from the top is a bell-shaped pocket of heat-resistant glass containing a mercury arc lamp by which the interior of the vessel can be illuminated. An outlet for unabsorbed gases communicates with the atmosphere through a reflux condenser. In order to carry out the reaction perchlorethylene is charged into the reaction vessel together with a small amount of sulphuric acid or oleum, e. g., 0.1% of the weight of the perchlorethylene, although amounts as small as 0.01% or as large as 1.0% may be used. The contents of the reaction vessel are then heated to an elevated temperature, e. g., to a temperature between 95° C. and 110° C., and oxygen is passed in as quickly as it can be absorbed, while maintaining the elevated temperature. Reaction proceeds rapidly at first but after some time, say 5 to 10 days, reaction becomes very slow. Oxidation is then stopped and the trichloracetyl chloride is recovered by distillation and, if desired, purified, for example as described in British specification 546,561.

In the above process, instead of using sulphuric acid or oleum, another strong mineral acid which is substantially non-volatile under the conditions of the oxidation process may be used, e. g., phosphoric acid.

We prefer to carry out the process at temperatures at which the product is substantially free from the isomeric compound believed to be perchlorethylene oxide, e. g., at 95° C. to 110° C., but if desired lower temperatures of the order of 50° C. may be employed, any oxide in the product being subsequently converted to the acid chloride, as described in British specification No. 534,732, by continued heating or by treatment with a suitable anhydrous metal chloride catalyst such as aluminium chloride. If it is desired to effect the transformation with a secondary or tertiary amine it will be necessary to remove the sulphuric acid first, for example, by neutralisation with soda ash.

The following examples illustrate but do not limit our invention, all parts being parts by weight:

Example 1

106 parts of perchlorethylene and 0.1 part of 65% oleum were heated to 100–102° C. in a jacketed lead-lined vessel illuminated internally a pocket of heat-resistant glass. Oxygen was then passed in at the rate of 0.31 part per hour, while stirring the perchlorethylene and maintaining the temperature at the above value by passing steam through the jacket. Oxidation continued at a substantial rate for 110 hours, after which it was found that the liquor in the lead-lined vessel contained 84% by weight of trichloracetyl chloride.

In a similar run carried out at the same temperature and with the same oxygen rate but without any addition of catalyst to the perchlorethylene, it was found that the rate of oxidation had become uneconomically slow after 150 hours. The liquor in the lead-lined vessel then contained only 60% of trichloracetyl chloride, the remainder being unchanged perchlorethylene.

Example 2

A run was carried out as in Example 1 using 96 parts of perchlorethylene, 0.1 part of 98% sulphuric acid, and 0.05 part of 65% oleum, and passing in oxygen at the rate of 0.31 part per hour while maintaining the temperature at 100–102° C. Oxidation continued at a substantial rate for 113 hours, after which the liquor in the lead-lined vessel contained 95% by weight of trichloracetyl chloride.

We claim:

1. The photochemical process for the production of trichloracetyl chloride which comprises reacting oxygen with perchlorethylene in the presence of light photochemically equivalent to that emitted by a mercury arc lamp at a temperature not lower than about 50° C. under conditions such that the perchlorethylene is maintained in the liquid phase, said perchlorethylene containing 0.01% to 1% of a strong mineral acid which is substantially non-volatile under the aforesaid conditions taken from the group consisting of oleum and sulfuric acid.

2. The photochemical process for the production of trichloracetyl chloride which comprises reacting oxygen with perchlorethylene in the presence of light photochemically equivalent to that emitted by a mercury arc lamp at a temperature of about 50 to 110° C. under conditions such that the perchlorethylene is maintained in the liquid phase, said perchlorethylene containing 0.01% to 1% of a strong mineral acid which is substantially non-volatile under the aforesaid conditions taken from the group consisting of oleum and sulfuric acid.

3. The photochemical process for the production of trichloracetyl chloride which comprises reacting oxygen with perchlorethylene in the presence of light photochemically equivalent to that emitted by a mercury arc lamp at a temperature of about 95 to 110° C. under conditions such that the perchlorethylene is maintained in the liquid phase, said perchlorethylene containing 0.01 to 1.0% by weight of a strong mineral acid which is substantially non-volatile under the aforesaid conditions taken from the group consisting of oleum and sulfuric acid.

ARNOLD RUSHMER.
WILLIAM W. SMITH.

REFERENCES CITED

The following references are of record in the file of this patent:

UNITED STATES PATENTS

| Number | Name | Date |
|---|---|---|
| 1,976,265 | Mugden et al. | Oct. 9, 1934 |
| 2,292,129 | Kirkbride | Aug. 4, 1942 |
| 2,321,823 | Kirkbride | June 15, 1943 |

FOREIGN PATENTS

| Number | Country | Date |
|---|---|---|
| 340,872 | Germany | Sept. 2, 1921 |